(12) United States Patent
Choi et al.

(10) Patent No.: US 9,709,846 B2
(45) Date of Patent: Jul. 18, 2017

(54) LIQUID CRYSTAL DISPLAY (LCD) PANEL, LCD AND MANUFACTURING METHOD THEREOF

(71) Applicant: BOE TECHNOLOGY GROUP CO., LTD., Beijing (CN)

(72) Inventors: Hyun Sic Choi, Beijing (CN); Hui Li, Beijing (CN); Zhiqiang Xu, Beijing (CN); Yoon Sung Um, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 119 days.

(21) Appl. No.: 14/378,086

(22) PCT Filed: Dec. 9, 2013

(86) PCT No.: PCT/CN2013/088902
§ 371 (c)(1),
(2) Date: Aug. 11, 2014

(87) PCT Pub. No.: WO2015/027611
PCT Pub. Date: Mar. 5, 2015

(65) Prior Publication Data
US 2015/0316817 A1 Nov. 5, 2015

(30) Foreign Application Priority Data
Aug. 29, 2013 (CN) .......................... 2013 1 0383057

(51) Int. Cl.
*G02F 1/1335* (2006.01)
*G02F 1/1341* (2006.01)
(Continued)

(52) U.S. Cl.
CPC ...... *G02F 1/133553* (2013.01); *G02F 1/1334* (2013.01); *G02F 1/1341* (2013.01);
(Continued)

(58) Field of Classification Search
CPC .......................... G02F 1/133555; G02F 1/1334
See application file for complete search history.

(56) References Cited

U.S. PATENT DOCUMENTS 7,738,062 B2  6/2010  Kataoka et al.
8,111,355 B2  2/2012  Chu
(Continued)

FOREIGN PATENT DOCUMENTS

CN  1749816 A  3/2006
CN  1851547 A  10/2006
(Continued)

OTHER PUBLICATIONS

Translation of CN202939393U 2013-05-15.*
(Continued)

*Primary Examiner* — Phu Vu
(74) *Attorney, Agent, or Firm* — Collard & Roe, P.C.

(57) ABSTRACT

A liquid crystal display (LCD) panel, an LCD and a manufacturing method thereof. The LCD panel comprises a first substrate (1) and a second substrate (2) arranged opposite to each other; a liquid crystal layer (3) is disposed between the first substrate (1) and the second substrate (2); the first substrate (1) comprises a plurality of pixel regions; each pixel region comprises a transmission section (4) and a reflection section (5); the first substrate is provided with a reflective layer (6) disposed in the reflection section (5); polymers (30) formed by polymerization of ultraviolet curable monomers are uniformly distributed in the liquid crystal layer (3) of the reflection section (5). The LCD panel adopts a single cell gap and controls the phase retardation amount of reflected light emitted out from the reflection section (5) through the polymers (30), so that phase of the reflected light can match with the phase of transmitted light emitted out from the transmission section (6).

17 Claims, 6 Drawing Sheets

(51) Int. Cl.
      *G02F 1/1334*      (2006.01)
      *G02F 1/1343*      (2006.01)
(52) U.S. Cl.
      CPC .................. *G02F 1/133555* (2013.01); *G02F 2001/13415* (2013.01); *G02F 2001/134372* (2013.01); *G02F 2202/023* (2013.01)

(56) References Cited

U.S. PATENT DOCUMENTS

| 8,199,286 B2 | 6/2012 | Yang et al. |
| 2006/0240587 A1* | 10/2006 | Yang ................. G02F 1/133555 438/30 |
| 2013/0114028 A1 | 5/2013 | Xu et al. |
| 2014/0078452 A1 | 3/2014 | Lu et al. |
| 2014/0118669 A1 | 5/2014 | Zhao |

FOREIGN PATENT DOCUMENTS

| CN | 101520563 A | 9/2009 |
| CN | 102629034 A | 8/2012 |
| CN | 102645798 A | 8/2012 |
| CN | 102707355 A | 10/2012 |
| CN | 202939393 A | 5/2013 |
| JP | 2009116194 A | 5/2009 |
| TW | 1333091 B | 11/2010 |

OTHER PUBLICATIONS

Chinese Office Action of Chinese Application no. 201310383057.X with English translation, mailed Sep. 30, 2014.

English Translation of the International Search Report of PCT/CN2013/088902 published in English on Mar. 5, 2015.

English translation of the International Preliminary Report on Patentability and Written Opinion of the International Searching Authority of PCT/CN2013/088902, issued Mar. 1, 2016.

International Search Report, International Preliminary Report on Patentability and Written Opinion of the International Searching Authority of PCT/CN2013/088902 in Chinese, mailed Dec. 9, 2013.

\* cited by examiner

| Result | Bright State | Dark State |
|---|---|---|
| Emitted Light | ↕ | |
| Upper Polarizer | ↕ | |
| Second λ/4 Compensation Polarizer | ↕ | ↔ |
| Liquid Crystal Layer (λ/2) | ↻ | ↻ |
| Second λ/4 Compensation Polarizer | ↻ | |
| Lower Polarizer | ↔ | |
| Light Emitted from Backlight | ✳ | |

ID_CRYSTAL DISPLAY (LCD) PANEL, LCD AND MANUFACTURING METHOD THEREOF

LIQUID CRYSTAL DISPLAY (LCD) PANEL, LCD AND MANUFACTURING METHOD THEREOF

CROSS REFERENCE TO RELATED APPLICATIONS

This application is the National Stage of PCT/CN2013/088902 filed on Dec. 9, 2013, which claims priority under 35 U.S.C. §119 of Chinese Application No. 201310383057.X filed on Aug. 29, 2013, the disclosure of which is incorporated by reference.

TECHNICAL FIELD

Embodiments of the present invention relate to the field of liquid crystal display (LCD), and in particular, to an LCD panel, an LCD and a manufacturing method thereof.

BACKGROUND

With the development of display technology, LCDs are gradually favored by users due to the characteristics such as light weight, low thickness, small volume and the like.

Advanced super dimension switch (ADSDS) technology is advanced LCD panel technology, in which a multi-dimensional electric field is formed by electric fields produced on edges of slit electrodes on the same plane and electric fields produced between a slit electrode layer and a plate electrode layer, so that liquid crystal molecules at all the orientations over electrodes and between the slit electrodes in a liquid crystal cell can be rotated, and hence the working efficiency of liquid crystals and the transmission efficiency can be improved. Compared with other LCD panel technology, ADSDS can improve the image quality of a thin-film transistor liquid crystal display (TFT-LCD) and has the advantages such as high resolution, high transmission, low power consumption, wide viewing angle, high aperture ratio, low color difference, no push Mura and the like.

However, in the condition of strong ambient light, the brightness of backlight is not enough and will bring about difficulty in viewing the images displayed on a screen. Moreover, when the ambient light environment is adapted only by modifying the brightness of the backlight, the power consumption can be increased and the display effect of the LCD can be reduced.

SUMMARY

The embodiments of the present invention relates to an LCD panel, which comprises a first substrate and a second substrate arranged opposite to each other, and a liquid crystal layer disposed between the first substrate and a second substrate, the first substrate comprising a plurality of pixel regions, each pixel region comprising a transmission section and a reflection section. The first substrate is provided with a reflective layer disposed in the reflection section; polymers formed by polymerization of ultraviolet curable monomers are uniformly distributed in the liquid crystal layer of the reflection section; and the LCD panel adopts a single cell gap and controls phase retardation amount of reflected light emitted out from the reflection section with the polymers, so that phase of the reflected light can match with the phase of transmitted light emitted out from the transmission section.

In one example, the weight of the ultraviolet curable monomers is 3 to 5 percent of that of liquid crystals.

In one example, the first substrate further comprises a transparent substrate, a pixel electrode, a protective layer and a common electrode in sequence from the bottom up; the common electrode is arranged with an interval in the horizontal direction; and the reflective layer is disposed between the transparent substrate and the pixel electrode.

In one example, a slope surface is formed at an edge of the reflective layer; an angle of slope of the slope surface is less than 80 degrees; and the pixel electrode disposed on the slope surface and the protective layer disposed on the slope surface are inclined along the slope surface.

In one example, the angle of slope is 30 to 70 degrees.

In one example, the first substrate further comprises a transparent substrate, a pixel electrode, a protective layer and a common electrode in sequence from the bottom up; the common electrode is arranged with an interval in the horizontal direction; and the reflective layer is disposed between the pixel electrode and the protective layer.

In one example, a slope surface is formed at an edge of the reflective layer; and the protective layer disposed on the slope surface is inclined along the slope surface.

In one example, the proportion of the transmission section to the reflection section is 6:4 to 9:1.

The embodiment of the present invention provides an LCD, which comprises any foregoing LCD panel.

The embodiment of the present invention provides a method for manufacturing an LCD panel. The method comprises: forming a pixel electrode, a reflective layer, a protective layer and a common electrode on a transparent substrate by patterning processes, in which a region provided with the reflective layer is a reflection section and a region not provided with the reflective layer is a transmission section; dripping liquid crystals into the transmission section and dripping a mixed solution of liquid crystals and ultraviolet curable monomers into the reflection section; and shielding the transmission section with a mask plate, exposing the reflection section, curing the ultraviolet curable monomers to form polymers in the liquid crystals of the reflection section.

In one example, the weight of the ultraviolet curable monomers is 3 to 5 percent of that of the liquid crystals.

In one example, the process of forming the reflective layer, the pixel electrode, the protective layer and the common electrodes on the transparent substrate by patterning process comprises: depositing an optical reflective material film on the transparent substrate, forming the reflective layer by a patterning process, and taking the region provided with the reflective layer as the reflection section and the region not provided with the reflective layer as the transmission section; and forming the pixel electrode, the protective layer and the common electrode respectively on the transparent substrate provided with the reflective layer by patterning process.

In one example, a slope surface is formed at an edge of the reflective layer; an angle of slope of the slope surface is less than 80 degrees; and the pixel electrode disposed on the slope surface and the protective layer disposed on the slope surface are inclined along the slope surface.

In one example, the angle of slope is 30 to 70 degrees.

In one example, the process of forming the pixel electrode, the reflective layer, the protective layer and the common electrodes on the transparent substrate by patterning process comprises: forming the pixel electrode on the transparent substrate by a patterning process; depositing an optical reflective material film on the transparent substrate provided with the pixel electrode, forming the reflective layer by a patterning process, and taking the region provided with the reflective layer as the reflective region and the region not provided with the reflective layer as the transmission section; and forming the protective layer and the common electrode respectively on the transparent substrate provided with the reflective layer by patterning process.

In one example, a slope surface is formed at an edge of the reflective layer; and the protective layer disposed on the slope surface is inclined along the slope surface.

In one example, the proportion of the transmission section to the reflection section is 6:4 to 9:1; and the mask plate comprises a shielding area and a transmission area, wherein the proportion of the shielding area to the transmission area corresponds to the proportion of the transmission section to the reflection section.

BRIEF DESCRIPTION OF THE DRAWINGS

Simple description will be given below to the accompanying drawings required in the description of the embodiments to provide a more clear understanding of the embodiments or the technical proposals in the prior art. Obviously, the drawings described below only involve some embodiments of the present invention. Other accompanying drawings may also be obtained by those skilled in the art without creative labor on the basis of the accompanying drawings.

DETAILED DESCRIPTION

Detailed description will be given below to the LCD panel, the LCD and the manufacturing method thereof, provided by the embodiments of the present invention, with reference to the accompanying drawings.

It should be understood that the embodiments described are only one part of embodiments of the present invention but not all the embodiments. All the other embodiments made by those skilled in the art without creative work on the basis of the embodiments of the present invention should fall within the scope of protection of the present invention.

Embodiment 1

Figure 1:
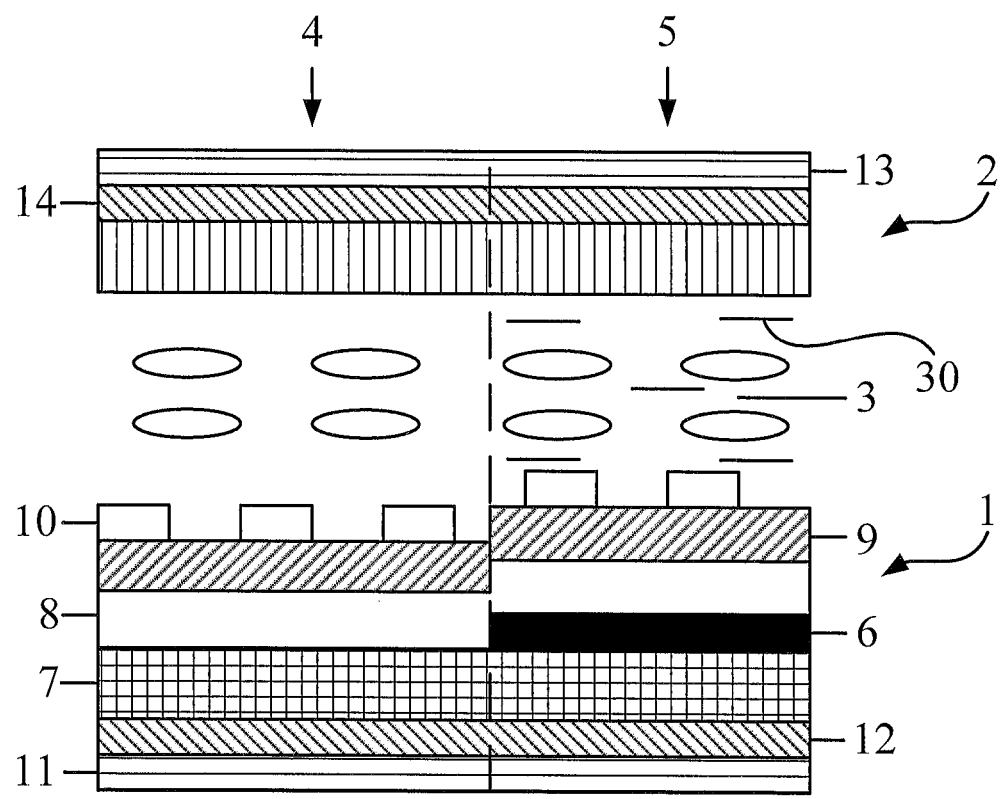
FIG. 1 is a schematic structural view of an LCD panel provided by embodiment 1 of the present invention.

An LCD panel, as illustrated in FIG. 1, comprises a first substrate 1 and a second substrate 2 that are arranged opposite to each other; a liquid crystal layer 3 is interposed between the first substrate 1 and the second substrate 2; the first substrate 1 comprises a plurality of pixel regions defined by gate lines and data lines intercrossed; and each pixel region comprises a transmission section 4 and a reflection section 5.

The first substrate 1 is provided with a reflective layer 6, and the reflective layer 6 is disposed in the reflection section 5.

Polymers 30 formed by the polymerization of ultraviolet curable monomers are uniformly distributed in the liquid crystal layer 3 corresponding to the reflection section 5.

The LCD panel adopts a single cell gap and controls the phase retardation amount of the reflected light emitted from the reflection section 5 by means of the polymers 30, so that the phase of the reflected light matches with the phase of the transmitted light emitted out from the transmission section 6.

It should be noted that: because the light of the transmission section 4 is directly emitted by backlight and the light of the reflection section 5 is incident from a surface of the LCD panel at first, reflected by the reflective layer 6, and then emitted out from the surface of the LCD panel, the optical length of the light of the reflection section 5 is twice the optical length of the light of the transmission section 4. Moreover, the phase retardation amount of the light of the reflection section, in liquid crystal molecules of the reflection section 5 and controlled by means of the polymers 30 formed by the polymerization of the ultraviolet curable monomers, is ½ of that of the transmission section 4. In this way, the light emitted out from the transmission section 4 and the light emitted out from the reflection section 5 satisfy the transflective basic working principle, and hence the display of the transflective LCD panel can be achieved.

In general, as illustrated in FIG. 1, the first substrate 1 provided with gate lines and data lines is an array substrate; the second substrate 2 is a color filter (CF) substrate; and liquid crystals are dripped on the first substrate 1 to form the liquid crystal layer 3. When the liquid crystals are dripped on the first substrate 1, the reflection section 5 and the transmission section 4 should be distinguished; to this end, two drip nozzles can be respectively arranged; pure liquid crystals are stored in a liquid crystal accommodating cavity of one drip nozzle; and liquid crystals mixed with ultraviolet curable monomers are stored in a liquid crystal accommodating cavity of the other drip nozzle. In the process of image display, two light sources are used; on one hand, the backlight provided for the LCD panel is taken as a first light source for the transmission section 4; on the other hand, the light obtained by the reflection of incident ambient light is taken as a second light source for the reflection section 5; in this way, the reflected natural light of the reflection section 5 can be used as the second light source and configured to compensate the first light source provided by the backlight. With the compensation to the first light source, the image resolution of the LCD panel can be also maintained when the brightness of the first light source is reduced, and hence the power consumption of the backlight can be reduced by the reduction of the brightness of the first light source. Compared with an LCD panel completely relying on a backlight, an LCD panel with low power consumption is provided. The reflection of the ambient light in the reflection section 5 is achieved by means of the reflective layer 6 disposed in the reflection section 5. The reflection layer 6 may be made of a material commonly employed by those skilled in the art, e.g., metal or metal oxide capable of plasma deposition.

However, because aluminum has good light reflectivity and appropriate price, the reflective layer 6 may be made of aluminum in one example.

In general, the thickness of a pixel electrode 8 and a common electrode 10 is 400 to 700 Å; the thickness of a protective layer 9 is 2,500 Å; the thickness of the reflective layer 6 is 2,000 to 3,000 Å; the common electrode 10 is strip electrodes; and the distance between adjacent common electrode 10 in the horizontal direction is 5 to 8 micrometers. But the structure of the layers may also be appropriately adjusted according to different produced LCD products. No limitation will be given here.

In addition, as for commonly used materials in the field of LCD, a transparent substrate 7 may be a glass substrate or a plastic substrate; the pixel electrode 8 and the common electrode 10 may be made of indium tin oxide (ITO), indium zinc oxide (IZO) or the like; and the protective layer 9 may be a single-layer film made of silicon nitride, silicon oxide or silicon oxynitride and may also be a multi-layer film formed by layers made of any of the above materials. The structures of layers are not limited to the above materials and may also be formed by other materials. No limitation will be given here.

The proportion of the transmission section 4 to the reflection section 5 may be adjusted according to different requirements for different LCD products. For instance, as for electrical equipments often used at home, due to relatively weak ambient light, LCD panels with a large proportion of the transmission section 4 can be selected; as for mobile terminals, due to relatively intense ambient light as the mobile terminals are often used outdoors, the proportion of the reflection section 5 may be increased; however, as the mobile terminals may also be used at places with weak ambient light, the case that the reflected light of the reflection section 5 cannot be completely relied on are taken as the light sources must also be considered. Therefore, in one example, the proportion of the transmission section 4 to the reflection section 5 may be 6:4 to 9:1.

Figure 2:
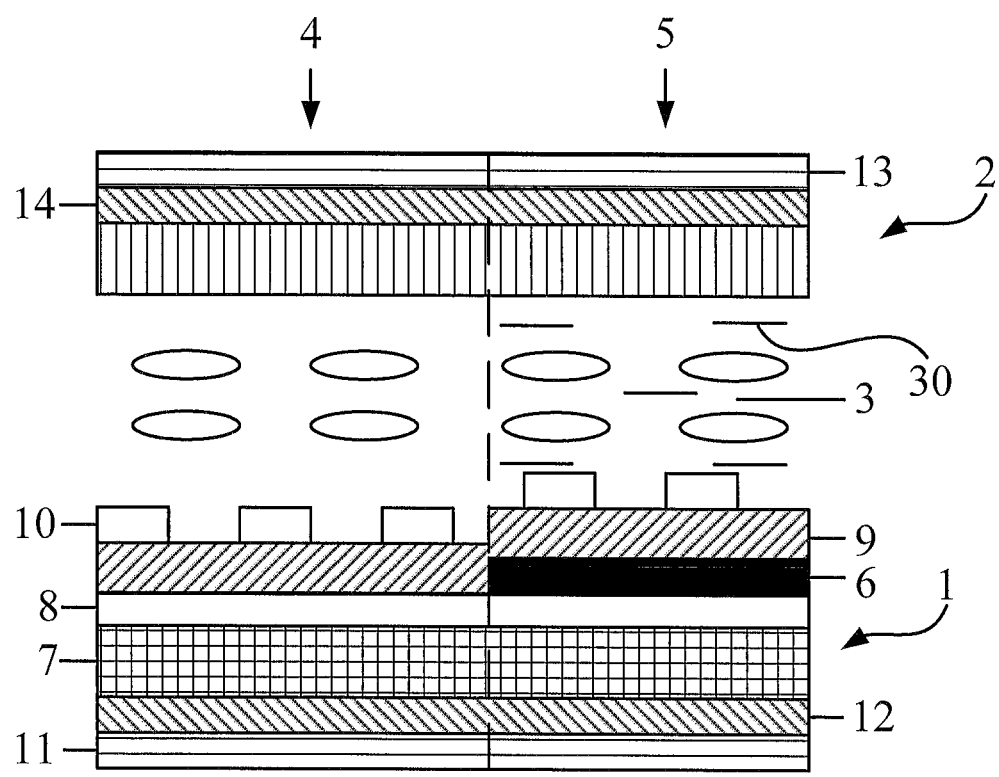
FIG. 2 is a schematic structural view of another LCD panel provided by embodiment 1 of the present invention.

It should be noted that: the first substrate 1 further comprises a transparent substrate 7, a pixel electrode 8, a protective layer 9 and a common electrode 10; the common electrode 10 is strip electrodes and arranged at an interval in the horizontal direction; the sequence of the above structures may be as shown in FIG. 1, namely the transparent substrate 7, the reflective layer 6, the pixel electrode 8, the protective layer 9 and the common electrode 10 is arranged in sequence from the bottom up; and the reflective layer 6 is disposed between the transparent substrate 7 and the pixel electrode 8. In addition, optionally, as illustrated in FIG. 2, the reflective layer 6 may be also disposed between the pixel electrode 8 and the protective layer 9. The position of the reflective layer 6 may be selected according to actual requirements. No limitation will be given here.

Figure 3:
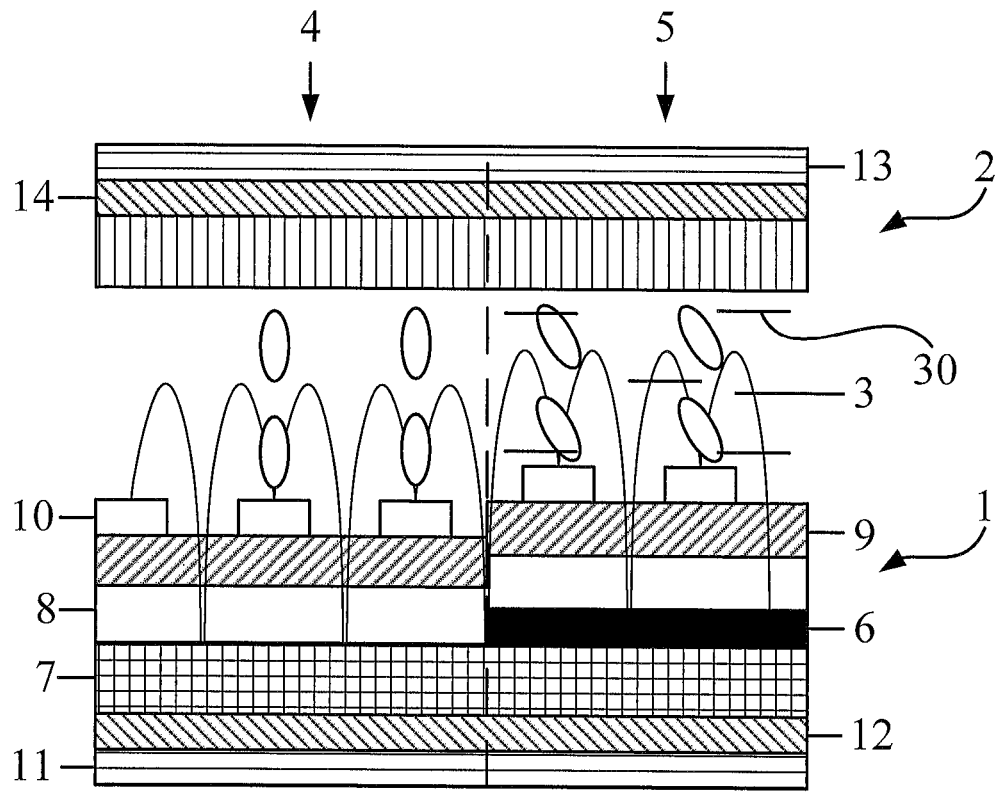
FIG. 3 is a schematic diagram illustrating the process of applying voltage across a common electrode and a pixel electrode in embodiment 1 of the present invention.

As illustrated in FIG. 2 or 3, a first λ/4 compensation polarizer 12 and a lower polarizer 11 are disposed on one side of the first substrate 1 far away from the liquid crystal layer 3; incident light is polarized by the lower polarizer 11 to form linearly polarized light; the linearly polarized light is polarized by the first λ/4 compensation polarizer 12 to form circularly polarized light; a second λ/4 compensation polarizer 14 and an upper polarizer 13 are disposed on one side of the second substrate 2 far away from the liquid crystal layer 3; the circularly polarized light is restored to linearly polarized light by the second λ/4 compensation polarizer 14; and the linearly polarized light is emitted or blocked by the upper polarizer 13. In general, the polarization direction of the lower polarizer 11 is perpendicular to the polarization direction of the upper polarizer 13. In this case, light will be shielded by the upper polarizer 13 if not polarized when running through structures such as the liquid crystal layer 3, and will run through the upper polarizer 13 and realize display if polarized by liquid crystal molecules.

In the transflective working mode, the optical length of the light incident into the reflection section 5 and then reflected out from the LCD panel is twice the optical length of light emitted out from the transmission section 4, and hence the phase retardation amount of the light emitted out from the reflection section 5 is larger than that of the light emitted out from the transmission section 4. In order to make the phases of the light emitted out from the transmission section 4 and the light emitted out from the reflection section 5 consistent, the light incident into the reflection section 5 should be subjected to phase retardation. Herein, the phase retardation is adjusted by the polymers 30 in the liquid crystal layer 3 of the reflection section 5. The polymers 30 are formed by the polymerization of the ultraviolet curable monomers.

As the ultraviolet curable monomers are uniformly distributed in the liquid crystals of the liquid crystal layer 3, the polymers 30 are also uniformly distributed in the liquid crystal layer 3 corresponding to the reflection section 5 after ultraviolet curing. The ultraviolet curable monomers may be monomers of acrylic esters, vinyl esters, vinyl ethers or the like. As the ultraviolet curable monomers may be selected from available monomers by those skilled in the art, the monomers are only illustrated by examples and not intended to limit the structure of the ultraviolet curable monomers.

When the LCD panel is not started, as illustrated in FIGS. 1 and 2, the liquid crystal molecules in the liquid crystal layer 3 are horizontally distributed, and the backlight of the transmission section 4 is in the off-state. Although the light will be reflected by the reflective layer 6 in the reflection section 5, the emitted light will be blocked by the upper polarizer 13 as the circularly polarized light is not polarized by the liquid crystal molecules in the liquid crystal layer 3.

As for the case of image display with the LCD panel, description is given here by taking the LCD panel as shown in FIG. 1 as an example; the figure is only for illustrative description and does not represent the true rotation angle of the liquid crystal molecules; an electric field as shown in FIG. 3 is formed by respectively applying voltage to the pixel electrode 8 and the common electrode 10; and the liquid crystal molecules are driven to rotate under the action of the electric field. It should be noted that the rotation angle of the liquid crystal molecules in the transmission section 4 and the rotation angle of the liquid crystal molecules in the reflection section 5 are different from each other. The liquid crystal molecules in the transmission section 4 will rotate according to the formed electric field; in contrast, because the liquid crystal layer 3 of the reflection section 5 is provided with the polymers 30 which can reduce the rotation angle of the liquid crystal molecules in the reflection section 5 and reduce the phase retardation of the reflected light, the phase retardation of the liquid crystal molecules in the transmission section 4 is twice the phase retardation of the liquid crystal molecules in the reflection section 5; and because the LCD panel adopts a single cell gap and the optical length of the light in the reflection section 5 is twice the optical length of the light in the transmission section 4, the light emitted out from the transmission section 4 and the light emitted out from the reflection section 5 can have same phase. Here, in the process of dripping liquid crystals, the usage amount of the ultraviolet curable monomers mixed into the liquid crystals can be adjusted according to the voltage applied across the pixel electrode 8 and the common electrode 10 when the LCD panel is started. However, in order to prevent the polymers formed by the ultraviolet curable monomers from excessively hindering the rotation of the liquid crystal molecules and avoid formation of polymers in a large area due to excessive polymerization of the ultraviolet curable monomers and hence avoid the influence upon display effect, in one example, the weight of the ultraviolet curable monomers may be 3 to 5 percent of that of the liquid crystals.

When the LCD panel conducts display, the light emitted out from the reflection section 5 and the light emitted out from the transmission section 4 have the same phase through different rotation amounts of liquid crystals, thereby achieving display.

Description will be given below to the processes of achieving bright state and dark state of the transmission section 4 and the reflection section 5 with reference to FIGS. 4 and 5; the dark state corresponds to the non-display state of the LCD panel, and the bright state corresponds to the display state of the LCD panel.

(1) When no voltage is applied to the LCD panel, both the transmission section 4 and the reflection section 5 are in the dark state. The specific optical path diagrams are shown in the column of Dark State in FIGS. 4 and 5.

Figure 4:
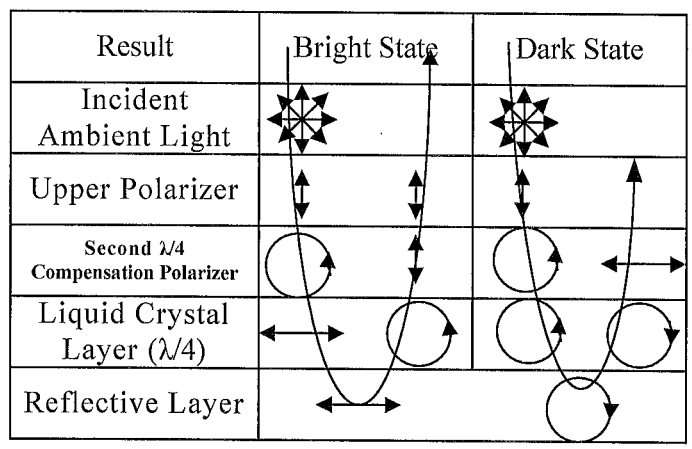
FIG. 4 is an optical path diagram of a reflection section in the LCD panel provided by embodiment 1 of the present invention.

In the reflection section 5, as illustrated in FIG. 4, the ambient light is natural light, is the collection of polarized light in all directions, and runs through the upper polarizer 13; description is given here by taking the case that a transmission axis of the upper polarizer is in the vertical direction as an example; linearly polarized light parallel to the transmission axis of the upper polarizer 13 (namely linearly polarized light in the vertical direction) is produced; left-handed circularly polarized light is produced after the linearly polarized light runs through the second λ/4 compensation polarizer 14; when the left-handed circularly polarized light runs through the liquid crystal layer 3, as the liquid crystal molecules of the liquid crystal layer 3 are not affected by the electric field and have no retardation function on the left-handed circularly polarized light; the left-handed circularly polarized light is converted into right-handed circularly polarized light after reaching the reflective layer 6 and being reflected by the reflective layer 6; and the right-handed circularly polarized light enters the liquid crystal layer 3 again and is not retarded, and runs through the second λ/4 compensation polarizer 14 again and then is converted into linearly polarized light in the horizontal direction, namely linearly polarized light perpendicular to the transmission axis of the upper polarizer 13. Therefore, the linearly polarized light cannot be emitted out from the upper polarizer 13, and hence the dark state of the reflection section 5 is formed.

Figures 5, 6:
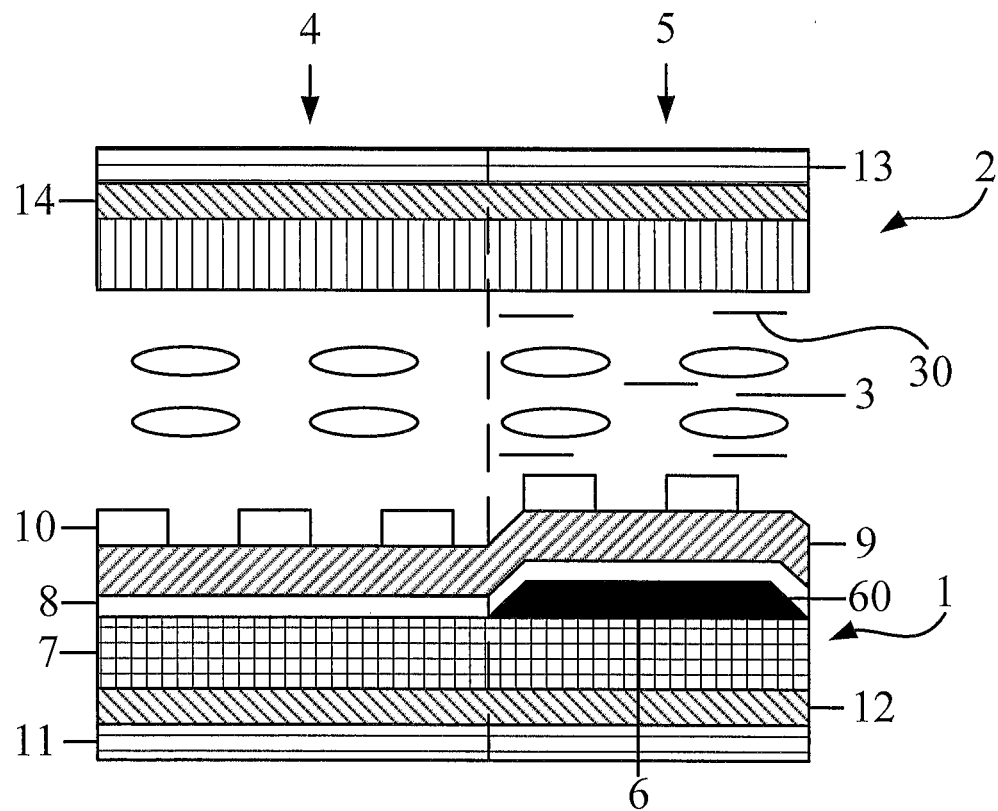
FIG. 5 is an optical path diagram of a transmission section in the LCD panel provided by embodiment 1 of the present invention.
FIG. 6 is a schematic structural view of an LCD panel provided by embodiment 2 of the present invention.

In the transmission section 4, as illustrated in FIG. 5, the light emitted from the backlight runs through the lower polarizer 11. A transmission axis of the lower polarizer 11 and the transmission axis of the upper polarizer 13 are perpendicular to each other, namely the transmission axis of the lower polarizer 11 is in the horizontal direction. The light emitted from the backlight is close to natural light and is the collection of linearly polarized light in all directions; the light runs through the lower polarizer 11 to produce linearly polarized light in the horizontal direction parallel to the transmission axis of the lower polarizer 11; right-handed circularly polarized light is produced after the linearly polarized light runs through the first 214 compensation polarizer 12; when the right-handed circularly polarized light runs through the liquid crystal layer 3, as the liquid crystal molecules of the liquid crystal layer 3 are not affected by the electric field and have no retardation function on the right-handed circularly polarized light; the right-handed circularly polarized light directly enters the second λ/4 compensation polarizer 14 and is converted into linearly polarized light in the horizontal direction; as the transmission axis of the upper polarizer 13 is in the vertical direction, the linearly polarized light perpendicular to the transmission axis of the upper polarizer 13 cannot be emitted out from the upper polarizer 13; and hence the dark state of the transmission section 4 is formed.

(2) When voltage is applied to the LCD panel, namely the case as shown in FIG. 3, both the transmission section 4 and the reflection section 5 are in the bright state. The specific optical path diagrams are as shown in the column of Bright State in FIGS. 4 and 5. When voltage is applied to the LCD panel, the liquid crystal molecules in the liquid crystal layer 3 of the transmission section 4 are deflected and orientated under the action of fringe field effect; when polarized light runs through the liquid crystal layer 3 of the transmission section 4, λ/2 phase retardation is produced. The liquid crystal molecules in the liquid crystal layer 3 of the reflection section 5 are deflected and orientated under the action of fringe field effect; the deflection is reduced as it is limited by the polymers 30; and when the polarized light runs through the liquid crystal layer 3 of the reflection section 5, λ/4 phase retardation is produced. The specific conditions are as follows.

In the reflection section 5, as illustrated in FIG. 4, the ambient light runs through the upper polarizer 13 to produce linearly polarized light parallel to the transmission axis of the upper polarizer 13 (the vertical direction); left-handed circularly polarized light is produced after the linearly polarized light runs through the second λ/4 compensation polarizer 14; the left-handed circularly polarized light runs through the liquid crystal layer 3, and due to the λ/4 phase retardation of the liquid crystal molecules of the liquid crystal layer 3, the left-handed polarized light is converted into linearly polarized light in the horizontal direction after running through the liquid crystal layer 3; the linearly polarized light is still the linearly polarized light in the horizontal direction after being reflected by the reflective layer 6; the linearly polarized light runs through the liquid crystal layer 3 again and is converted into left-handed circularly polarized light; and the left-handed circularly polarized light is converted into linearly polarized light in the vertical direction, parallel to the transmission axis of the upper polarizer 13, after running through the second λ/4 compensation polarizer 14. Therefore, the linearly polarized light can be emitted out from the upper polarizer 13, and hence the bright state of the reflection section 5 is obtained.

In the transmission section 4, as illustrated in FIG. 5, the light emitted from the backlight runs through the lower polarizer 11; as the transmission axis of the lower polarizer 11 is in the horizontal direction, the light runs through the lower polarizer 11 to produce linearly polarized light of which the polarization direction is parallel to the transmission axis of the lower polarizer 11; right-handed circularly polarized light is produced after the linearly polarized light runs through the first λ/4 compensation polarizer 12; the right-handed circularly polarized light is converted into left-handed circularly polarized light due to the λ/2 phase retardation of the liquid crystal layer 3; the right-handed circularly polarized light directly enters the second λ/4 compensation polarizer 14 and is converted into linearly polarized light in the vertical direction; as the optical transmission axis of the upper polarizer 13 is in the vertical direction, the light can be emitted out from the upper polarizer 13; and hence the bright state of the transmission section 4 is formed.

As described above, different states, namely display state and non-display state, of the LCD panel can be achieved by the switching between the dark state and the bright state of the LCD panel due to the deflection of the liquid crystal molecules.

In the LCD panel provided by the embodiment of the present invention, the uniformly distributed polymers are formed through the exposure of the ultraviolet curable monomers in the liquid crystals of the reflection section, so that the rotation of the liquid crystals in the reflection section can be limited, and hence the phase retardation of the liquid crystal molecules in the transmission section is twice the phase retardation of the liquid crystal molecules in the reflection section and the optical length of the light emitted out from the transmission section is twice the optical length of the light emitted out from the reflection section. Therefore, the emitted light of the reflection section and the emitted light of the transmission section have the same phase; the transflective condition of an LCD is satisfied; the image resolution of the LCD under intense ambient light is improved; and the power consumption of the LCD is reduced.

Moreover, in manufacturing the transflective LCD panel, provision of double cell gap results in complex process; but the LCD panel provided by the embodiment of the present invention adopts a single cell gap, and hence the manufacturing process of the transflective LCD panel is simplified.

Embodiment 2

When the structure of the LCD panel is as shown in FIG. 6, the first substrate 1 comprises a transparent substrate 7, a pixel electrode 8, a protective layer 9 and a common electrode 10 in sequence from the bottom up; the common electrode 10 is arranged at an interval in the horizontal direction; and a reflective layer 6 is disposed between the transparent substrate 7 and the pixel electrode 8.

Because dry etching is usually adopted in the process of preparing the reflective layer 6 of the first substrate 1, a slope surface 60 is formed at the edge of the reflective layer 6 formed by etching. After the reflective layer 6 is formed, the pixel electrode 8 and the protective layer 9 are formed on the reflective layer 6. As the deposition of the two layers is performed on the reflective layer 6, the pixel electrode 8 disposed on the slope surface 60 and the protective layer 9 disposed on the slope surface 60 are inclined along the slope surface 60 in the process of forming the pixel electrode 8 and the protective layer 9. The angle of the formed slope surface 60 can be controlled by the control of the concentration of blowing air and the blowing speed when the reflective layer 6 is etched.

It should be noted that: as the thickness of the pixel electrode 8 is very small, if the angle of the slope surface 60 is too large, the pixel electrode 8 may be fractured on the slope surface 60. The angle of slope herein refers to the angle of an acute angle between the horizontal direction and the slope surface 60. Therefore, the angle of slope may be less than 80 degrees. When the angle of slope is relatively small, the pixel electrode 8 may be inclined along the gentle slope surface 60 and cover the reflective layer 6. But in order to avoid the problem that the coverage of the reflective layer 6 is overlarge due to too small angle of slope, for instance, the angle of slope may be 30 to 70 degrees.

Embodiment 3

Figure 7:
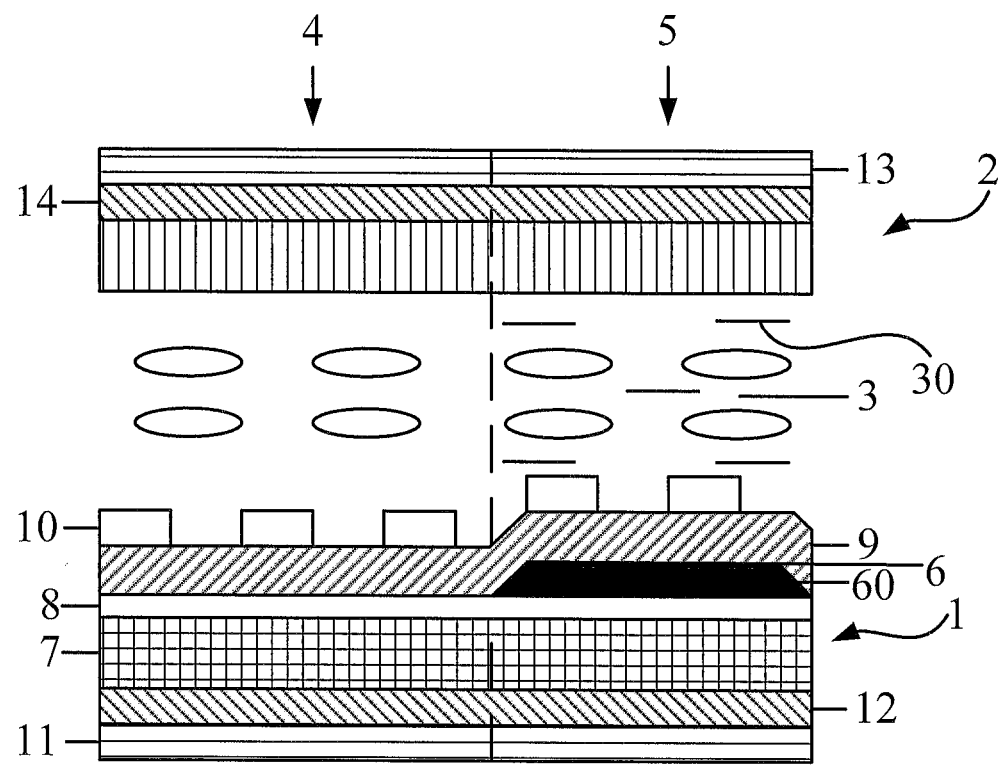
FIG. 7 is a schematic structural view of an LCD panel provided by embodiment 3 of the present invention.

When the structure of the LCD panel is shown in FIG. 7, the first substrate 1 comprises a transparent substrate 7, a pixel electrode 8, a protective layer 9 and a common electrode 10 in sequence from the bottom up; the common electrode 10 is arranged at an interval in the horizontal direction; and a reflective layer 6 is disposed between the pixel electrode 8 and the protective layer 9.

The differences from the embodiment 2 are that: in the process of manufacturing the first substrate 1, the pixel electrode 8 is formed on the transparent substrate 7 by deposition and etching at first; the reflective layer 6 is then formed on the pixel electrode 8; and the protective layer 9 and the common electrode 10 are formed on the reflective layer 6. As the reflective layer 6 is formed on the pixel electrode 8, the protective layer 9 that is on the slope surface 60 and formed at the edge of the reflective layer 6 is inclined along the slope surface 60. As the protective layer 9 formed on the reflective layer 6 has a relatively large thickness, the problem of fracture cannot occur, and hence the problem that a structure fracture occurs due to the overlarge angle of the slope surface 60 of the reflective layer 6 can be avoided.

Embodiment 4

Corresponding to any of the foregoing LCD panels, the present invention further provides an LCD, which comprises the LCD panel according to any one of the embodiments 1 to 3.

In the LCD panel provided by the embodiment of the present invention, the uniformly distributed polymers are formed by the exposure of the ultraviolet curable monomers in the liquid crystals of the reflection section, so that the rotation of the liquid crystals of the reflection section can be limited, and hence the phase retardation of the liquid crystal molecules in the transmission section is twice the phase retardation of the liquid crystal molecules in the reflection section and the optical length of the light emitted out from the transmission section is twice the optical length of the light emitted out from the reflection section. Therefore, the emitted light of the reflection section and the emitted light of the transmission section have the same phase; the transflective condition of an LCD is satisfied; the image resolution of the LCD under intense ambient light is improved; and the power consumption of the LCD is reduced. Moreover, in the process of manufacturing a transflective LCD panel, the provision of a double cell gap results in a complex process; but the LCD panel provided by the embodiment of the present invention adopts a single cell gap, and hence the manufacturing process of the transflective LCD panel is simplified.

Embodiment 5

Corresponding to any one of foregoing LCD panels, the embodiment of the present invention further provides a method for manufacturing the LCD panel. The method comprises the following steps:

S100: forming a pixel electrode, a reflective layer, a protective layer and a common electrode on a transparent substrate by patterning processes, in which a region provided with the reflective layer is a reflection section and a region not provided with the reflective layer is a transmission section.

The transparent substrate 7 is placed into deposition equipment, and the pixel electrode 8, the reflective layer 6, the protective layer 9 and the common electrode 10 are respectively formed on the transparent substrate 7 by deposition and patterning processes. The structure of the formed first substrate 1 may be respectively as shown in FIGS. 1 and 2 according to the different positions of the reflective layer 6. The first substrate 1 comprises the structures in sequence as shown in FIG. 1, namely comprises the transparent substrate 7, the reflective layer 6, the pixel electrode 8, the protective layer 9 and the common electrode 10 in sequence from the bottom up, and the reflective layer 6 is disposed between the transparent substrate 7 and the pixel electrode 8. Alternatively, the first substrate 1 comprises the structures in sequence as shown in FIG. 2, namely comprises the transparent substrate 7, the pixel electrode 8, the reflective layer 6, the protective layer 9 and the common electrode 10 in sequence from the bottom up, and the reflective layer 6 is disposed between the pixel electrode 8 and the protective layer 9. The position of the reflective layer 6 may be selected according to actual requirements. No limitation will be given here.

The reflective layer 6 may be made of a material commonly applied by those skilled in the art, e.g., a metal or a metal oxide which can be subjected to plasma deposition. Further, because aluminum has good light reflectivity and appropriate price, the reflective layer 6 may be made of aluminum in one example.

In general, the thickness of the pixel electrode 8 and the common electrode 10 is from 400 to 700 Å; the thickness of the protective layer 9 is 2,500 Å; the thickness of the reflective layer 6 is 2,000 to 3,000 Å; and the distance between adjacent common electrodes 10 in the horizontal direction is 5 to 8 micrometers. But the structure of the layers can also be appropriately modified according to different LCD products to be produced. No limitation will be given here.

In addition, among commonly used materials in the field of LCD, a transparent substrate 7 may be a glass substrate or a plastic substrate; the pixel electrode 8 and the common electrode 10 may be made of ITO, IZO or the like; and the protective layer 9 may be a single-layer film made of silicon nitride, silicon oxide or silicon oxynitride and may also be a multi-layer film formed by layers made of the above materials. The structures of the layers are not limited to the above materials and may also be formed by other materials. No limitation will be given here.

It should be noted that: the reflection section 5 is defined by the coverage of the reflective layer 6 in the process of depositing the reflective layer 6; the proportion of the transmission section 4 to the reflection section 5 can be adjusted according to different requirements in different LCD products. For instance, as to electrical equipments often used at home, due to relatively weak ambient light, LCD panels with a large proportion of the transmission section 4 may be selected; as to mobile terminals, due to relatively intense ambient light as the mobile terminals are often used outdoors, the proportion of the reflection section 5 can be increased; however, as the mobile terminals may be also used at places with weak ambient light, the case that the reflected light of the reflection section 5 and other light are taken as the light sources must also be considered. Therefore, in one example, the proportion of the transmission section 4 to the reflection section 5 may be 6:4 to 9:1.

Figure 8:
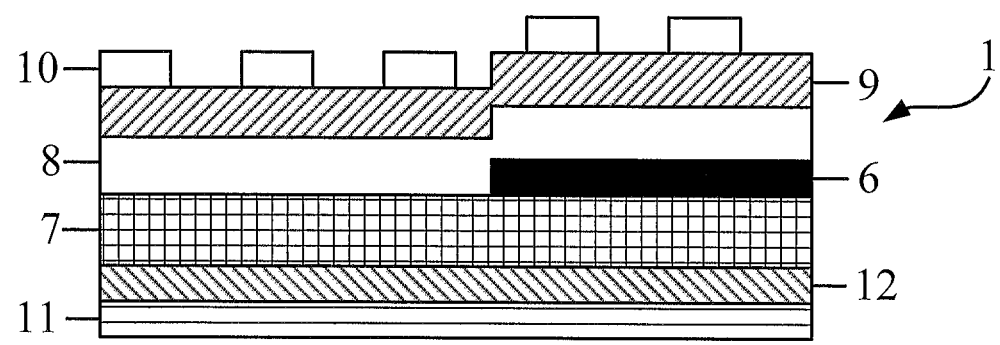
FIG. 8 is a schematic diagram of a first substrate manufactured by embodiment 5 of the present invention.

After the pixel electrode 8, the reflective layer 6, the protective layer 9 and the common electrodes are formed, the first substrate 1 as shown in FIG. 8 is formed.

S101: dripping liquid crystals into the transmission section and dripping a mixed solution of liquid crystals and ultraviolet curable monomers into the reflection section.

Figure 9:
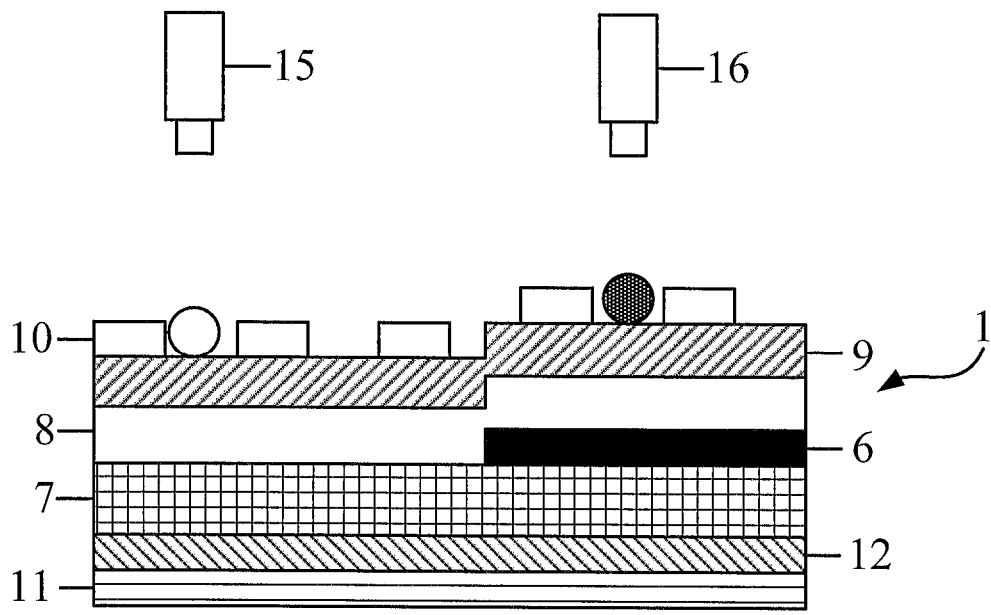
FIG. 9 is a schematic diagram illustrating the process of dripping liquid crystals in the method for manufacturing the LCD panel provided by embodiment 5 of the present invention.

After the first substrate 1 is formed, a sealant is coated around the periphery of the first substrate 1 and spacers are provided; after the spacers are placed, the first substrate 1 is placed in a dripping device; and the working mode of the dripping device is set. Two drip nozzles 15 and 16 are needed in the dripping device; pure liquid crystals are stored in a liquid crystal accommodating cavity of the drip nozzle 15, and liquid crystals mixed with ultraviolet curable monomers are stored in a liquid crystal accommodating cavity of the drip nozzle 16. In the process of dripping the liquid crystals, as illustrated in FIG. 9, the liquid crystals must be dripped into the transmission section 4 and the reflection section 5 through the two drip nozzles 15 and 16 respectively, and here the drip nozzle 16 is configured to drip the liquid crystals mixed with the ultraviolet curable monomers into the reflection section 5, and the drip nozzle 15 is configured to drip the pure liquid crystals into the transmission section 4.

It should be noted that the sequence of dripping the liquid crystals mixed with the ultraviolet curable monomers into the reflection section 5 and dripping the pure liquid crystals into the transmission section 4 may be selected according to actual requirements. No limitation will be given here.

After the liquid crystals mixed with the ultraviolet curable monomers are dripped into the reflection section 5 and the pure liquid crystals are dripped into the transmission section 4, the first substrate 1 with the liquid crystals having been completely dripped is taken out from the dripping device.

S102: shielding the transmission section with a mask plate, exposing the reflection section, curing the ultraviolet curable monomers to form polymers in the liquid crystals of the reflection section.

Figure 10:
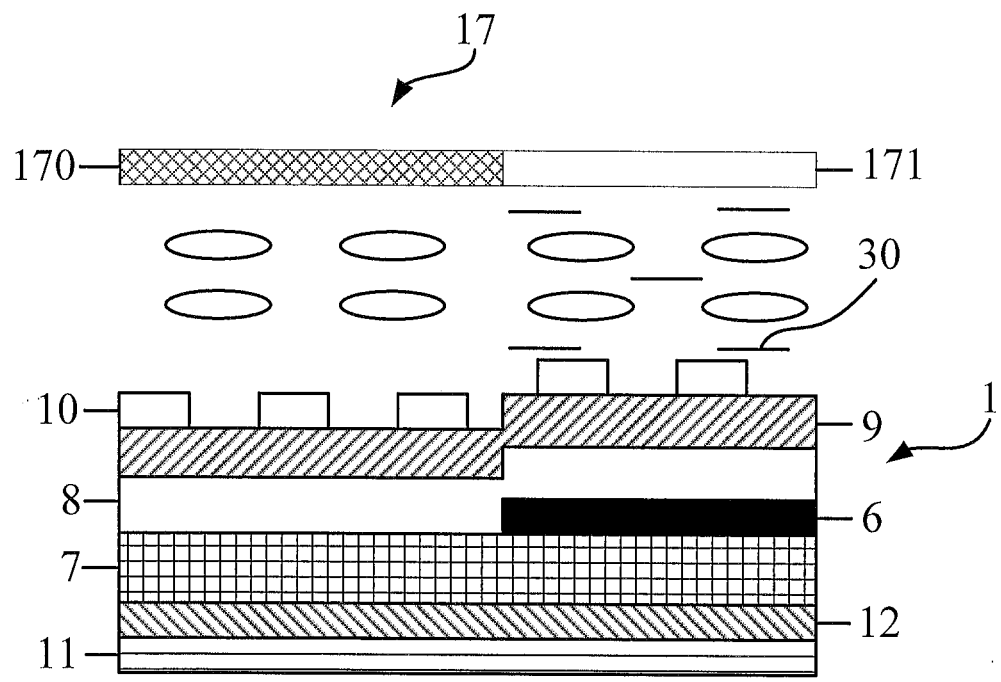
FIG. 10 is a schematic diagram illustrating the process of forming polymers by mask exposure in the method for manufacturing the LCD panel provided by embodiment 5 of the present invention.

The first substrate 1 filled with the dripped liquid crystals is placed into exposure equipment, and a mask plate 17 is adopted for shielding. As illustrated in FIG. 10, the mask plate 17 comprises a shielding area 170 and a transmission area 171; the proportion of the shielding area 170 to the transmission area 171 corresponds to the proportion of the transmission section 4 to the reflection section 5 on the first substrate 1. That is to say, it can be understood that the shielding area 170 of the mask plate 17 corresponds to the transmission section 4 of the first substrate 1, and the transmission area 171 of the mask plate 17 corresponds to the reflection section 5 of the first substrate 1. In the process of dripping the liquid crystals, the usage amount of the ultraviolet curable monomers mixed into the liquid crystals can be modified according to the voltage applied across the pixel electrode 8 and the common electrode 10 when the LCD panel is started. However, in order to prevent the polymers formed by the ultraviolet curable monomers from excessively hindering the rotation of the liquid crystal molecules and avoid the forming of polymers with a large area due to excessive polymerization of the ultraviolet curable monomers and hence avoid the influence upon display effect, in one example, the weight of the ultraviolet curable monomers may be 3 to 5 percent of that of the liquid crystals.

It should be noted that the proportion of the transmission section 4 to the reflection section 5 on the first substrate 1 may be modified according to different LCD products. For instance, the proportion of the transmission section 4 to the reflection section 5 may be 6:4 to 9:1. Corresponding to the proportion of the transmission section 4 to the reflection section 5, the proportion of the shielding area 170 to the transmission area 171 of the mask plate 17 may also be 6:4 to 9:1. Due to the setting of the proportion of the shielding area 170 to the transmission area 171 of the mask plate 17, the ultraviolet curable monomers in the reflection section 5 of the first substrate 1, corresponding to the transmission area 171, may be fully exposed and uniformly polymerized to form polymers 30; the transmission section 4 is completely shielded by the shielding area 170 of the mask plate 17; and therefore the case that the transmission section 4 is affected by the exposure of ultraviolet light can be avoided. Moreover, the exposure time may be different as the ultraviolet curable monomers are different and the polymerization processes are different. Different exposure time periods can be elected by those skilled in the art according to different ultraviolet curable monomers. No limitation will be given here.

After the mask plate 17 is disposed on the first substrate 1, the ultraviolet curable monomers in the liquid crystals of the reflection section 5 are uniformly polymerized to form the polymers through the exposure of the exposure equipment.

After the exposure process is completed, the first substrate 1 is taken out; the first substrate 1 and the second substrate 2 are subjected to a cell-assembly process; and hence the LCD panel is formed.

In the LCD panel provided in the embodiment of the present invention, the uniformly distributed polymers are formed by the exposure of the ultraviolet curable monomers in the liquid crystals of the reflection section, so that the rotation of the liquid crystals of the reflection section can be limited, and hence the phase retardation of the liquid crystal molecules in the transmission section is twice the phase retardation of the liquid crystal molecules in the reflection section and the optical length of the light emitted out from the transmission section is twice the optical length of the light emitted out from the reflection section. Therefore, the emitted light of the reflection section and the emitted light of the transmission section have the same phase; the transflective condition of an LCD is satisfied; the image resolution of the LCD under intense ambient light is improved; and the power consumption of the LCD is reduced. Moreover, in the process of manufacturing a transflective LCD panel, the provision of a double cell gap results in complex process, however the LCD panel provided by the embodiment of the present invention adopts a single cell gap, and hence the manufacturing process of the transflective LCD panel is simplified.

Embodiment 6

It should be noted that: when the first substrate 1 with the following structure sequence is formed, namely when a reflective layer, a pixel electrode, a protective layer and common electrodes are formed in sequence from the bottom up and the reflective layer is disposed between the transparent substrate 7 and the pixel electrode 8, the process of forming the pixel electrode, the reflective layer, the protective layer and the common electrodes on the transparent substrate by patterning processes comprises the following:

S100A: depositing an optical reflective material film on the transparent substrate, forming the reflective layer by a patterning process, wherein a region provided with the reflective layer functions as a reflection section and a region not provided with the reflective layer function as a transmission section.

In order to form the structure in which the reflective layer 6 is disposed between the transparent substrate 7 and the pixel electrode 8, namely in order to finally form the LCD panel as shown in FIG. 6, the optical reflective material is needed to be deposited on the transparent substrate 7 at first. The optical reflective material may be a material commonly applied by those skilled in the art, e.g., a metal or a metal oxide that can be subjected to plasma deposition. Further, as aluminum has good light reflectivity and appropriate price, the optical reflective material may be aluminum in one example.

When the reflective layer 6 is formed by a patterning process, the regions on the first substrate 1 are divided according to whether the reflective layer 6 is formed. That is to say, the region provided with the reflective layer 6 is taken as a reflection section 5, and the region not provided with the reflective layer 6 is taken as a transmission section 4.

S100B: forming the pixel electrode, the protective layer and the common electrodes on the transparent substrate provided with the reflective layer by patterning processes.

The pixel electrode 8, the protective layer 9 and the common electrode 10 are formed subsequently on the transparent substrate 7 provided with the reflective layer 6 by patterning processes. The structure sequence of the formed first substrate 1 is as follows: the transparent substrate 7, the reflective layer 6, the pixel electrode 8, the protective layer 9 and the common electrode 10 are formed in sequence from the bottom up.

It should be noted that: because dry etching is employed in the process of forming the reflective layer 6 by a patterning process, a slope surface 60 is formed at the edge of the reflective layer 6. After the reflective layer 6 is formed, the pixel electrode 8 and the protective layer 9 are formed on the reflective layer 6. As the deposition of the two layers is performed on the reflective layer 6, the pixel electrode 8 disposed on the slope surface 60 and the protective layer 9 disposed on the slope surface 60 are inclined along the slope surface 60 in the process of forming the pixel electrode 8 and the protective layer 9. The angle of the formed slope surface 60 may be controlled through the control of the concentration of blowing air and the blowing speed when the reflective layer 6 is etched.

As the thickness of the pixel electrode 8 is very small, if the angle of slope of the slope surface 60 is too large, the pixel electrode 8 may be fractured on the slope surface 60. The angle of slope herein refers to the angle of an acute angle between the horizontal direction and the slope surface 60. Therefore, the angle of slope may be less than 80 degrees. When the angle of slope is too small, the pixel electrode 8 may be inclined along the gentle slope surface 60 and cover the reflective layer 6. But in order to avoid overlarge coverage the reflective layer 6 due to too small angle of slope, for instance, the angle of slope may be 30 to 70 degrees.

Embodiment 7

It should be further noted that: in order to finally form the LCD panel as shown in FIG. 7, the structure sequence of the formed first substrate 1 is as follows: a pixel electrode, a reflective layer, a protective layer and common electrodes are formed in sequence from the bottom up; and a reflective layer is disposed between the pixel electrode 8 and the protective layer 9. Here, the process of forming the pixel electrode, the reflective layer, the protective layer and the common electrodes on the transparent substrate by patterning processes comprises the following:

S100C: forming the pixel electrode on the transparent substrate by a patterning process.

A metal oxide film is deposited on the transparent substrate 7, and the pixel electrode 8 is formed by a patterning process.

S100D: depositing an optical reflective material film on the transparent substrate provided with the pixel electrode, forming the reflective layer by a patterning process, wherein a region provided with the reflective layer function as a reflection section and a region not provided with the reflective layer function as a transmission section.

In order to form the structure in which the reflective layer 6 is disposed between the pixel electrode 8 and the protective layer 9, the optical reflective material film is deposited on the transparent substrate 7 provided with the pixel electrode 8, and the reflective layer 6 is formed by a patterning process. The optical reflective materials may be a material commonly applied by those skilled in the art, e.g., a metal or a metal oxide that can be subjected to plasma deposition. Further, as aluminum has good light reflectivity and appropriate price, the optical reflective material may be aluminum in one example.

When the reflective layer 6 is formed by a patterning process, the regions on the first substrate 1 are divided according to whether the reflective layer 6 is formed. That is to say, the region provided with the reflective layer 6 is taken as a reflection section 5, and the region not provided with the reflective layer 6 is taken as a transmission section 4.

S100E: forming the protective layer and the common electrode on the transparent substrate provided with the reflective layer respectively by a patterning processes.

The protective layer 9 and the common electrode 10 are formed subsequently on the transparent substrate 7 provided with the reflective layer 6 by a patterning process, and finally the first substrate 1 is formed.

The differences from the embodiment 6 lie in that: in the process of manufacturing the first substrate 1, the pixel electrode 8 is formed on the transparent substrate 7 by deposition and etching at first; the reflective layer 6 is formed on the pixel electrode 8; and the protective layer 9 and the common electrode 10 are formed on the reflective layer 6. As the reflective layer 6 is formed on the pixel electrode 8, the protective layer 9 on the slope surface 60 formed at the edge of the reflective layer 6 is inclined along the slope surface 60. As the protective layer 9 formed on the reflective layer 6 has a relatively large thickness, the problem of fracture cannot occur, and hence the problem of structure fracture due to overlarge angle of the slope surface 60 of the reflective layer 6 can be avoided.

The foregoing is only some embodiments of the present invention and not intended to limit the scope of protection of the embodiments of the present invention. Any change or replacement may be easily made by those skilled in the art within the technical scope disclosed by the embodiments of the present invention and should all fall within the scope of protection of the embodiments of the present invention. Therefore, the scope of protection of the embodiments of the present invention should be defined by the appended claims.

The invention claimed is:

1. A liquid crystal display (LCD) panel, comprising a first substrate and a second substrate arranged opposite to each other, and a liquid crystal layer disposed between the first substrate and a second substrate, the first substrate comprising a plurality of pixel regions, each pixel region comprising a transmission section and a reflection section, wherein
the first substrate is provided with a reflective layer disposed in the reflection section;
and
the LCD panel adopts a single cell gap and controls phase retardation amount of reflected light emitted out from the reflection section with the polymers, so that phase of the reflected light can match with the phase of transmitted light emitted out from the transmission section;
wherein pure liquid crystals are dripped into the transmission section and liquid crystals mixed with ultraviolet curable monomers are dripped into the reflection section, respectively, and then the liquid crystals mixed with ultraviolet curable monomers are cured, so as to form polymers formed by polymerization of ultraviolet curable monomers uniformly distributed in the liquid crystal layer of the reflection section, and pure liquid crystals distributed in the liquid crystal layer of the transmission section.

2. The LCD panel according to claim 1, wherein weight of the ultraviolet curable monomers is 3 to 5 percent of that of liquid crystals.

3. The LCD panel according to claim 1, wherein the first substrate further comprises a transparent substrate, a pixel electrode, a protective layer and a common electrode in sequence from the bottom up; the common electrode is arranged with an interval in the horizontal direction; and
the reflective layer is disposed between the transparent substrate and the pixel electrode.

4. The LCD panel according to claim 3, wherein a slope surface is formed at an edge of the reflective layer; an angle of slope of the slope surface is less than 80 degrees; and
the pixel electrode disposed on the slope surface and the protective layer disposed on the slope surface are inclined along the slope surface.

5. The LCD panel according to claim 4, wherein the angle of slope is 30 to 70 degrees.

6. The LCD panel according to claim 1, wherein the first substrate further comprises a transparent substrate, a pixel electrode, a protective layer and a common electrode in sequence from the bottom up; the common electrode is arranged with an interval in a horizontal direction; and
the reflective layer is disposed between the pixel electrode and the protective layer.

7. The LCD panel according to claim 6, wherein a slope surface is formed at an edge of the reflective layer; and the protective layer disposed on the slope surface is inclined along the slope surface.

8. The LCD panel according to claim 1, wherein a proportion of the transmission section to the reflection section is 6:4 to 9:1.

9. A liquid crystal display, comprising the liquid crystal display panel according to claim 1.

10. A method for manufacturing a liquid crystal display (LCD) panel, comprising:
forming a pixel electrode, a reflective layer, a protective layer and a common electrode on a transparent substrate by patterning processes, in which a region provided with the reflective layer is a reflection section and a region not provided with the reflective layer is a transmission section;
dripping liquid crystals into the transmission section and dripping a mixed solution of liquid crystals and ultraviolet curable monomers into the reflection section; and shielding the transmission section with a mask plate, exposing the reflection section, and curing the ultraviolet curable monomers to form polymers in the liquid crystals of the reflection section.

11. The method according to claim 10, wherein a weight of the ultraviolet curable monomers is 3 to 5 percent of that of the liquid crystals.

12. The method according to claim 10, wherein forming the reflective layer, the pixel electrode, the protective layer and the common electrodes on the transparent substrate by patterning process comprises:

depositing an optical reflective material film on the transparent substrate, forming the reflective layer by a patterning process, wherein the region provided with the reflective layer functions as the reflection section and the region not provided with the reflective layer functions as the transmission section; and forming the pixel electrode, the protective layer and the common electrode respectively on the transparent substrate provided with the reflective layer by patterning process.

13. The method according to claim 12, wherein a slope surface is formed at an edge of the reflective layer; an angle of slope of the slope surface is less than 80 degrees; and the pixel electrode disposed on the slope surface and the protective layer disposed on the slope surface are inclined along the slope surface.

14. The method according to claim 13, wherein the angle of slope is 30 to 70 degrees.

15. The method according to claim 10, wherein forming the pixel electrode, the reflective layer, the protective layer and the common electrodes on the transparent substrate by patterning process comprises:

forming the pixel electrode on the transparent substrate by a patterning process;

depositing an optical reflective material film on the transparent substrate provided with the pixel electrode, forming the reflective layer by a patterning process, wherein the region provided with the reflective layer functions as the reflective region and the region not provided with the reflective layer functions as the transmission section; and forming the protective layer and the common electrode respectively on the transparent substrate provided with the reflective layer by patterning process.

16. The method according to claim 13, wherein a slope surface is formed at an edge of the reflective layer; and the protective layer disposed on the slope surface is inclined along the slope surface.

17. The method according to claim 10, wherein a proportion of the transmission section to the reflection section is 6:4 to 9:1; and the mask plate comprises a shielding area and a transmission area, wherein a proportion of the shielding area to the transmission area corresponds to the proportion of the transmission section to the reflection section.

* * * * *